US006952533B2

(12) United States Patent
Kim et al.

(10) Patent No.: US 6,952,533 B2
(45) Date of Patent: Oct. 4, 2005

(54) INTERNET PROTOCOL OVER WDM NETWORK, AND PACKET COMMUNICATION SYSTEM AND METHOD IN THE IPOW NETWORK

(75) Inventors: Byoung Whi Kim, Anyang (KR); Chu Hwan Yim, Taejon (KR); Jung Hee Hahn, Seoul (KR)

(73) Assignee: Electronics and Telecommunications Research Institute, Taejon (KR)

( * ) Notice: Subject to any disclaimer, the term of this patent is extended or adjusted under 35 U.S.C. 154(b) by 557 days.

(21) Appl. No.: 09/751,351

(22) Filed: Dec. 27, 2000

(65) Prior Publication Data

US 2001/0028488 A1 Oct. 11, 2001

(30) Foreign Application Priority Data

Dec. 27, 1999 (KR) ........................................ 1999-62429
Dec. 21, 2000 (KR) ........................................ 2000-79533

(51) Int. Cl.$^7$ ........................ H04B 10/00; H04B 10/20; H04J 14/00
(52) U.S. Cl. ............................ 398/166; 398/51; 398/59
(58) Field of Search ............................ 398/166, 51, 59, 398/83, 91, 1–24, 43, 45, 48, 57, 154

(56) References Cited

U.S. PATENT DOCUMENTS

| 4,855,729 | A | * | 8/1989 | Takeuchi et al. ............. 340/3.5 |
| 5,289,302 | A | * | 2/1994 | Eda .............................. 398/51 |
| 5,452,115 | A | * | 9/1995 | Tomioka ...................... 398/75 |
| 5,548,431 | A | * | 8/1996 | Shin et al. .................... 398/59 |
| 5,576,875 | A | * | 11/1996 | Chawki et al. ............... 398/72 |

(Continued)

OTHER PUBLICATIONS

Halabi, Bassam et al., "Tag Switching in Service Provider ATM Networks," *Cisco Systems*: pp 1–19, 1997.
Gerstel, O. et al., "Combined WDM and SONET Network Design," *IEEE*: pp. 734–743, 1999.

*Primary Examiner*—M. R. Sedighian
*Assistant Examiner*—Shi K. Li
(74) *Attorney, Agent, or Firm*—Seed IP Law Group PLLC

(57) ABSTRACT

There is disclosed an internet protocol over WDM (IPOW) network structure which can directly route/transmit packets via a wavelength division multiplexing (WDM) optical communication network, and a packet transmission system in the network structure and method using the network structure. The internet protocol over wavelength division multiplexing (WDM) network structure comprising: a plurality of sub-ring for connecting n number of terminals (where n is a positive integer) to which unique user wave lengths are respectively allocated; a main ring for connecting n number of connection nodes connecting sub-rings to which unique user wave lengths are respectively allocated; a single sub-ring controller for controlling the flows of a packet transmitted/received inside the sub-ring and a packet transmitted/received between the sub-ring and the main ring; and a main ring controller connected to the single sub-ring and the main ring, and controlling the flow of a packet transmitted/received inside the main ring, wherein the terminals and connection nodes each add/drop only their own unique wavelength signals, the sub-ring controller and main ring controller drop all the wavelength division multiplexed signals to de-multiplex the signals, load each of the signals on their unique user wavelengths in their destination terminals, and then multiplex again the signals to transmit to the sub-ring and main ring, the sub-ring controller adds the identifying code (which is called a λ tag) of the sub-ring having a destination terminal, to the transmitted packet, and then transmits it to the main ring. The present invention has an advantage that it can route the packet at high speed, and also significantly simplifies a network structure. In addition, the present invention can process several tens of terabit traffic, expensive optical elements or optical systems, and a high-performance traffic routing apparatus such as a terra-bit level controller, etc.

11 Claims, 7 Drawing Sheets

U.S. PATENT DOCUMENTS

| | | | | |
|---|---|---|---|---|
| 5,625,478 A | * | 4/1997 | Doerr et al. | 398/4 |
| 5,646,758 A | * | 7/1997 | Miki et al. | 398/100 |
| 5,771,111 A | * | 6/1998 | Domon et al. | 398/76 |
| 5,796,501 A | * | 8/1998 | Sotom et al. | 398/59 |
| 5,917,820 A | | 6/1999 | Rekhter | 370/392 |
| 6,020,986 A | * | 2/2000 | Ball | 398/1 |
| 6,044,076 A | * | 3/2000 | Yamamoto | 370/392 |
| 6,097,696 A | * | 8/2000 | Doverspike | 370/216 |
| 6,147,786 A | * | 11/2000 | Pan | 398/1 |
| 6,160,651 A | * | 12/2000 | Chang et al. | 398/79 |
| 6,226,111 B1 | * | 5/2001 | Chang et al. | 398/9 |
| 6,430,201 B1 | * | 8/2002 | Azizoglu et al. | 370/535 |
| 6,522,671 B1 | * | 2/2003 | Solheim et al. | 370/535 |
| 6,532,088 B1 | * | 3/2003 | Dantu et al. | 398/43 |
| 6,542,511 B1 | * | 4/2003 | Livermore et al. | 370/406 |
| 6,616,349 B1 | * | 9/2003 | Li et al. | 398/4 |

* cited by examiner

INTERNET PROTOCOL OVER WDM NETWORK, AND PACKET COMMUNICATION SYSTEM AND METHOD IN THE IPOW NETWORK

TECHNICAL FIELD

The invention relates generally to an Internet Protocol (IP) which can directly route-transmit packets via a Wavelength Division Multiplexing (WDM) optical communication network. More particularly, the present invention relates to an Internet Protocol Over WDM (IPOW) optical communication network, a packet transmitting/receiving system in the network and method using the network.

BACKGROUND OF THE INVENTION

A conventional method of routing/transmitting a packet will be below explained.

First, there is a TCP/IP (transmission control protocol/internet protocol), which is a standard protocol for processing IP packets. As TCP/IP is not limited by the type and size of LAN (local area network) and external networks connected to the LAN, there is an advantage that it could be flexibly configured. Since it is impossible to expect the structure of a network, however, IP addresses in all the nodes through the packet transverses must be translated for routing when a transfer path for a packet is established. Therefore, if it is desired that inter-LAN transverse packets are routed/transmitted at high speed, there are problems that the address system is complicated and the delay of the packet transfer is increased.

Next, there is an SDH/SONET (synchronous digital hierarchy/synchronous optical network), which is a representative method used to transfer an IP packet via all optical transfer path. More particularly, this method is one to transfer a SDH/SONET packet via an optical transfer path in which an overhead defined by SDH/SONET protocol is added to the IP packet. However, there is a drawback that its transfer efficiency is reduced since the amount of overhead added in SDH/SONET protocol hierarchy is great. Also, as the cost of the SDH/SONET apparatus is high, if it is used in a subscriber network for accommodating internet subscribers, it adds a substantial cost to the service providers and the subscribers. As well, as the transfer equipment and the optical system which have the same capacity must be installed at entire networks for implementing a self-healing function in the SDH/SONET apparatus, there are problems that it is nearly impossible to extend the capacity of the networks depending on demand on communications or a substantial cost is required upon extension of the capacity.

Then, there is an internet protocol in an asynchronous transfer mode (ATM) over SDH/SONET. This method is one by which after ATM frame information is added to an IP packet, overhead information on SDH/SONET must be added again in order to transfer the packet along the optical transfer path. This method, however, is the slowest method in the transfer efficiency.

Finally, in an internet protocol over WDM scheme that is commonly considered, if the total traffic is increased by terabit level, there is a problem that the routing processing capacity must be increased by the terabit level.

As mentioned above, there are advantages that the TCP/IP allows a flexible network configuration and the SDH/SONET or the ATM could provide various services through it. Due to flexibility of the network configuration and its service, however, there is a problem that the routing and transfer efficiency of a packet is lowered. Also, the above-mentioned schemes have a problem that they require expensive optical elements and systems such as OXC, OADM, wavelength converter, tunable LD, etc. so that they can be accommodated over WDM.

SUMMARY OF THE INVENTION

It is therefore an object of the present invention to provide an internet protocol over WDM network structure, and a packet transmit/receive system and method using the same which can route and transfer a packet at high speed in order to satisfy bandwidth and quality of service (QoS) being the core requirements in accommodating internet service. That is, the present invention is based on a wavelength division multiplexing technology for internet service, which is directed to supplement and comprise flexibility of network configuration, diversity of services, and the routing and transfer efficiency of packet.

In order to accomplish the above object, an internet protocol over wavelength division multiplexing (WDM) optical communication network structure according to the present invention is characterized in that it comprises:

The internet protocol over wavelength division multiplexing (WDM) network structure comprising: a plurality of sub-ring for connecting n number of terminals (where n is a positive integer) to which unique user wave lengths are respectively allocated; a main ring for connecting n number of connection nodes connecting sub-rings to which unique user wave lengths are respectively allocated; a single sub-ring controller connected to the single sub-ring and the main ring, and controlling the flows of a packet transmitted/received inside the sub-ring and a packet transmitted/received between the sub-ring and the main ring; and a main ring controller for controlling the flow of a packet transmitted/received inside the main ring, wherein the terminals and connection nodes each add/drop only their own unique wavelength signals, the sub-ring controller and main ring controller drop all the wavelength division multiplexed signals to de-multiplex the signals, load each of the signals on their unique user wavelengths in their destination terminals, and then multiplex again the signals to transmit to the sub-ring and main ring, and the sub-ring controller adds the identifying code (which is called a λ tag) of the sub-ring having a destination terminal, to the transmitted packet, and then transmits it to the main ring.

Also, A sub-ring controller, in an internet protocol over wavelength division multiplexing network structure including the n number of terminals (where n is a positive integer) to which unique user wavelengths are respectively allocated, and a sub ring for connecting the n number of terminals in a ring shape, comprising: a de-multiplexing means for dropping the wavelength division multiplexed signals passing through the sub-ring by wavelengths to de-multiplex the wavelength division multiplexed signals; a routing means for establishing the path of the de-multiplexed packet by the destination terminal, using the destination terminal address included in the packet; a packet grouping means for grouping the packet for which its path is established by its destination terminal, a wavelength allocating means for loading the packet grouped by its path on the unique user wavelengths of the destination terminals; and a wavelength multiplexing means for multiplexing all the wavelength transformation signals for all the destination terminals to transmit the multiplexed signals to the sub-ring.

Further, A main ring controller for receiving an extended packet to which a λ tag is attached front a source sub-ring controller to transmit the packet to a destination sub-ring controller, comprising: a λ-tag delineator for delineating a destination sub-ring using the λ-tag added to the packets; a λ-tag based switching section for distributing the packets by their destinations according to the λ-tag of the destination terminal; at least n number of buffers for storing the packets distributed according to the destination at the λ-tag based switching section; at least n number of lead frame sections for reading the packets from each of the buffers and for adding the λ-tag corresponding to the destination; and the n number of transmitters for reading the packets from each of the buffers to transmit the packets with optical signals having wavelengths allocated to the destination.

Also, A method of transmitting/receiving packets in a sub-ring controller for controlling transmission/reception of the packets between any two of terminals, in an internet protocol over wavelength division multiplexing (WDM) network including the n number of terminals (where n is a positive integer) to which unique user wavelengths are respectively allocated, comprising the steps of: if a source terminal transmits packets containing destination terminal addresses on their own unique user wavelengths, routing the paths of the packets by the destination terminal addresses using the destination terminal addresses contained in the packets; grouping the packets to be transmitted to the destination terminals; and loading the grouped packets on the unique user wavelengths of the destination terminals and then transmitting the packets to the sub-ring, whereby the destination terminal drops the grouped packets.

Also, An internet protocol over wavelength division multiplexing (WDM) network structure comprising: the n number of terminals (where n is a positive integer) to which unique user wavelengths are respectively allocated; a single controller for controlling the flow of a packet transmitted between two terminals; and a ring network for connecting the n number of terminals and the single controller in a ring shape, wherein wavelength division multiplexed signals are transmitted along the ring network, wherein the terminals each add/drop only their own unique user wavelength signals among the wavelength division multiplexed signals transmitted via the ring network, and the controller drops all the wavelength division multiplexed signals transmitted via the ring network to de-multiplex the signals, loads each of the signals on their unique user wavelengths in their destination terminals, and then multiplexes again the signals to transmit to the ring network.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE INVENTION

"An internet protocol over wavelength division multiplexing (WDM) optical communication network structure, a packet transmit/receive system in this network structure and method using the IPOW optical communication network structure" according to one embodiment of the present invention, will be explained in detail by way of a preferred embodiment with reference to accompanying drawings.

Figure 1:
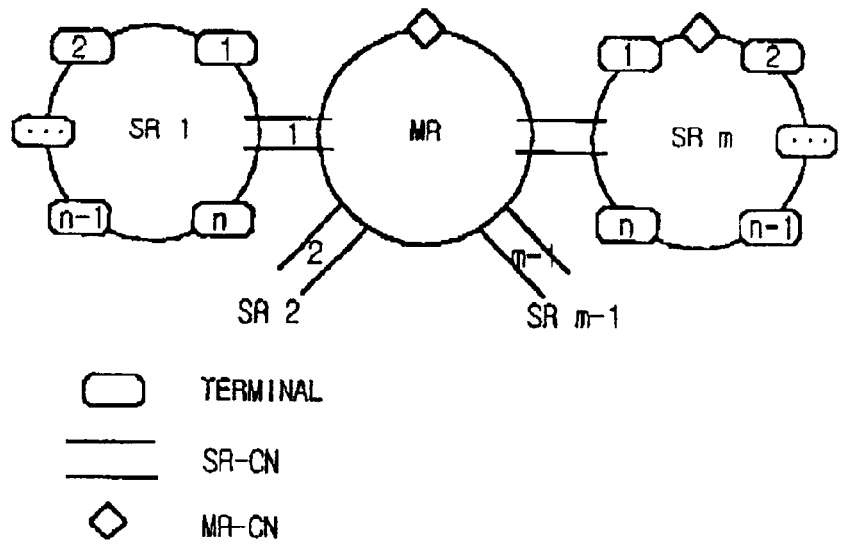
FIG. 1 is a sub-ring structure in an Internet Protocol Over WDM(IPOW) network according to one embodiment of the present invention.

FIG. 1 is a sub-ring structure in an internet protocol over WDM (hereinafter called "IPOW") network according to one embodiment of the present invention.

The internet protocol over WDM network includes the m number of connection nodes (where m is a positive integer) to which unique user wavelengths are respectively allocated, a single main ring controller (MR-CN) for controlling the flow of a packet transmitted between given two of connection nodes, and a main ring for connecting said m number of connection nodes and said single main ring controller in a ring shape, wherein each of the connection nodes are connected to said sub-ring via said sub-ring controller (SR-CN).

The n number of terminals (where n is a positive integer) to which unique user wavelengths are respectively allocated, and a single sub-ring controller for controlling the flow of a packet transmitted between two terminals are connected to the sub-ring controller, and the sub-ring connects said n number of terminals and said single sub-ring controller in a ring shape, wherein wavelength division multiplexed signals are transmitted along said sub-ring.

Figure 2:
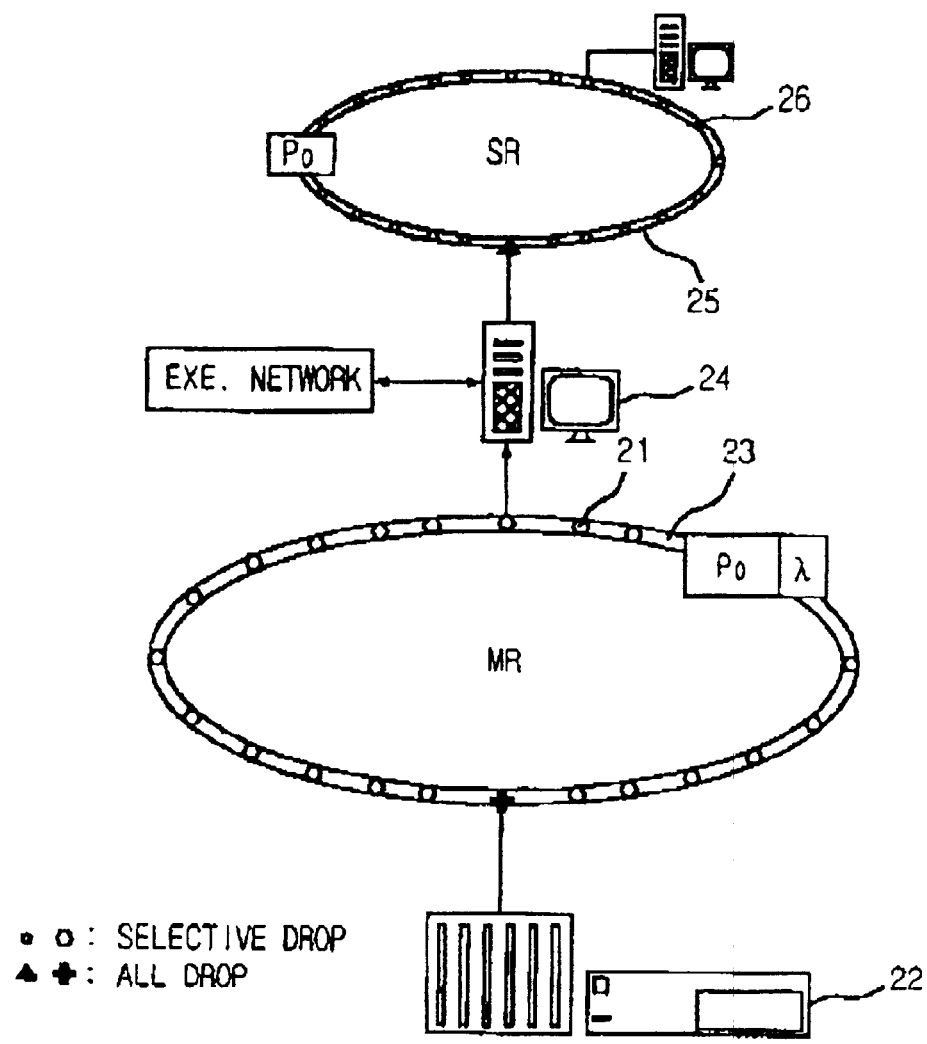
FIG. 2 shows horizontally extended structures of two sub-rings.

FIG. 2 illustrates an example of a network structure including a main ring and a single sub-ring in the IPOW network structure according to the present invention.

The network structure includes the m number of connection nodes (where m is a positive integer) 21 to which unique user wavelengths are respectively allocated, a single main ring controller 22 for controlling the flow of a packet transmitted between two connection nodes, and a main ring 23 for connecting the m number of connection nodes 21 and the single main ring controller 22 in a ring shape and along which wavelength division multiplexed signals can be transmitted, wherein the connection nodes 21 is connected to the sub-ring 25 via the sub-ring controller 24. Of course, n number of terminals may be connected to the sub-ring 25.

Each of the connection nodes 21 adds/drops only its own unique user wavelength signal among wavelength division multiplexed signals that are transmitted via the main ring 23 since wavelength couplers are mounted. The main ring controller 22 drops all the wavelength division multiplexed signals transmitted via the main ring 23 and then de-multiplexes the result. Then, it loads respective signals on their unique user wavelengths in the connection nodes to which the sub-ring belonging to their destination terminals is connected, multiplexes again the signals and then transmits the multiplexed signals to the main ring 23.

That is, m number of sub-rings is connected to this main ring, and n number of terminals is connected to respective sub-rings. In an IPOW network of a two-layer ring structure having these main ring/sub-rings, m×n number of terminals is connected. The main ring and the sub-ring are connected via a sub-ring controller. The sub-ring controller is a connection point of the main ring and the sub-ring and is also responsible for relaying transmission/reception of a packet between the terminals and the main ring. The main ring controller is a control node for switching/transmitting inter-sub-ring packets between the terminals connected to other sub-rings.

The network structure of the present invention has the following four prerequisites. First, all the sub-ring controllers share information on IP addresses of all the terminals connected to the whole network and the wavelength allocated to the sub-ring to which its IP address belongs. Second, all the terminals connected to a given sub-ring communicate with corresponding sub-ring controllers using different wavelengths. The terminals connected to the different sub-rings, however, may reuse the same wavelength. Third, all the sub-ring controllers connected to the main ring communicate with the main ring controller using different wavelengths. Fourth, respective terminals communicate via the sub-ring controllers each of which is connected to the sub-rings, respectively, and all the sub-ring controllers communicate via a single main ring controller managing them.

Above-mentioned structure of the sub-ring will now be explained in detail.

This sub-ring includes the n number of terminals (where n is a positive integer) to which unique user wavelengths are respectively allocated, a single sub-ring controller for controlling the flow of a packet transmitted between two terminals, and a sub-ring for connecting the n number of terminals and the single-ring controller in shape and which wavelength division multiplexed signals can be transmitted. To respective terminals may be connected end users or a group of users. If the end user is connected, an optical network interface card is mounted. If the group users are connected, an optical network interface unit is mounted.

Wavelength couplers, connected to the respective terminals, adds/drops only its own unique user wavelength signal among wavelength division multiplexed signals that are transmitted via the sub-ring. The sub-ring controller drops all the wavelength division multiplexed signals transmitted via the sub-ring to de-multiplex them. Then, it loads respective signals on their unique user wavelengths allocated to their destination terminals, multiplexes again the signals and then adds the multiplexed signal to the sub-ring.

In this IPOW network, a method of transmitting a packet between any two terminals will be explained as follows.

First, a method of transmitting a packet from a terminal i to a terminal j within a sub-ring will be explained as follows.

The terminal i generates a packet to be transmitted to the terminal j, adds/extends a source address and a destination address to the packet, and then loads the extended packet on his unique use wavelength ($\lambda_j$). Then, the wavelength coupler in the terminal i adds/multiplexes the unique user wavelength on which the extended packet is loaded to the wavelength division multiplexed signal in the sub-ring to send it. The wavelength division multiplexed signal transverse the sub-ring and then drops to the sub-ring controller. Then, the sub-ring controller de-multiplexes the wavelength division multiplexed signal, loads it on the unique user wavelength g($\lambda_j$) in the terminal j being the destination terminal, using the destination address included in the corresponding packet, and then performs wavelength division multiplexing process for the de-multiplexed wavelength division signal along with other wavelengths to transmit the result to the sub-ring. The wavelength coupler in the terminal j drops only its own unique user wavelength ($\lambda_j$) among the wavelength division multiplexed signals that flow into the sub-ring. By doing so, each of terminals belonging to the same sub-rings is transmitted by the sub-rings and the sub-ring controller, without traversing the main ring.

Figure 3:
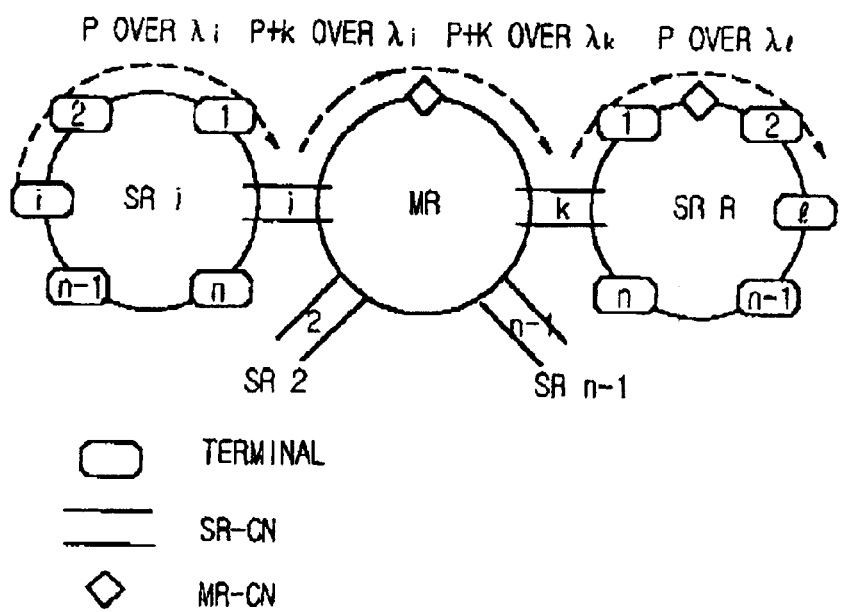
FIG. 3 shows vertically extended structures of three sub-rings.

Next, referring to FIGS. 2 and 3, a method of transmitting a packet between terminals belonged to different sub-rings will be explained as follows. FIG. 3 is a simplified view of the two-layer IPOW network for explaining a routing scheme in an internet protocol over WDM network according to one embodiment of the present invention.

As each of the terminals uses the wavelength allocated to itself to communicate with the sub-ring controller, both the terminal and the sub-ring controller transmits an optical signal only in one direction, for example, only in a clockwise direction or an ant-clockwise direction, so that wavelength collision does not occur within the sub-ring.

In case of the communication of each of the sub-ring controller connected to one main ring controller, each of the sub-ring controllers uses only the wavelength pre-allocated to itself to transmit/receive optical signal. Also, main ring controller transmits an optical signal only in one direction, for example, only in a clockwise direction or an ant-clockwise direction, so that wavelength collision does not occur within the main ring.

As can be seen from FIG. 3, there is shown the state in which a j terminal in the sub-ring i transmits an optical signal to a 1 terminal in the sub-ring k. The m number of sub-rings is connected to the connection nodes in the main rings via respective sub-ring controllers and the n number of terminals is connected to respective sub-rings. The number of wavelength used in the entire network is n, and the wavelengths allocated to respective terminals and sub-ring controllers are as follows.

That is, the use wavelength of the sub-ring controller i is $\lambda_i$ (where, i=1, . . . , n), and the use wavelength of the terminals (i, j) is $\lambda_j$ (where, j=1, . . . , n), wherein i is an index of the sub-ring and j is an index of the terminal. Therefore, the terminals (i, j) represent the j-th terminal connected to the i-th sub-ring.

Also, the arrows indicated dotted lines in FIG. 3 represent a transmit direction of the packet, and characters on the dotted lines represent wavelength used to transmit the packet. That is, the terminals (i, j) uses the wavelength $\lambda_j$ to transmit the packet to the sub-ring controller i and the sub-ring controller i uses the wavelength $\lambda_i$ to transmit the packet to the main ring controller. Meanwhile, in the main ring controller, the main ring transmits/receives an optical signal in which the wavelengths used by all the sub-ring controllers are multiplexed in a clockwise direction but each of the sub-ring controllers receives only the optical signal loaded on the wavelength allocated to itself. Also, in each of the sub-ring controllers, a corresponding sub-ring transmits/receives an optical signal in which the wavelengths used by all the terminals are multiplexed in a clockwise direction but each of the terminals transmits/receives only the optical signal loaded on the wavelength allocated to itself.

For example, if there is a packet P from the terminals (i, j) toward the terminals (k, l), (where, k≠1, . . . , n, l=1, . . . n), the terminals (i, j) uses the wavelength g$\lambda_j$ to the packet P to the sub-ring controller i.

Sub-ring controller i confirms destination address of the packet P by performing IP address comparison calculations. That is, as m×n number of terminals is connected in this IPOW network, totally n×n number of IP address comparison operations are performed. At this time, if the packet is transmitted/received between the terminals connected to the same sub-ring, the corresponding packet is routed in the corresponding sub-ring controller according to the existing internet protocol, without being transferred to the main ring.

But, as the destination of the packet P is the terminal (k, l), the sub-ring controller j adds the identifying code k (which is called a λ tag) of the wavelength $\lambda_k$ allocated to the sub-ring controller k and then loads the extended packet P+k on the wavelength $\lambda_j$ to transmit it to the main ring controller, This extended packet is loaded on the wavelength $\lambda_j$, experienced by wavelength division multiplexing process along with wavelengths in the other connection nodes, transmitted to the main ring and then dropped at the main ring controller.

Then, the main ring controller confirms the wavelength identifying code k of the extended packet P+k that is received via the wavelength $\lambda_j$ and then loads the extended packet P+k on the wavelength $\lambda_k$. Then, the main ring transmits the packet in a clockwise direction, the main ring controller performs a total m number of wavelength identifying code comparison calculations to extract its sub-ring to which its destination terminal is connected.

The sub-ring controller packet k removes k from the packet P+k, conforms that its destination is the i-th terminal and then transmits the packet P on the wavelength $\lambda_l$ to transmit it the sub-ring k. At this time, the sub-ring controller n performs a maximum n number of IP address comparison calculations and then transmits the packet, with a corresponding wavelength, to the destination terminal.

As the terminal l receives only the optical signal loaded on the wavelength $\lambda_l$, the packet P generated at the terminals (i, j) arrives at the terminals (k, l). In addition, other terminals than the terminals (k, l) do not receive the packet P.

At this point, the signals transmitted to the main ring and the sub-ring are wavelength division multiplexed signals, where different wavelengths are allocated to each of the connection nodes connected to the main ring and different wavelengths are also allocated to each of the terminals connected to the sub-rings. In order for the n number of wavelength used in any of the sub-rings to be reused in all the sub-rings, each of the sub-rings must accommodate the n number of terminals and the n number of the sub-rings is connected to one main ring. By doing so, the number of wavelength used in the entire network can be minimized, and at the same time the number of terminals that can be accommodated, can be maximized. That is, making the parameter m=n as mentioned above is a method of maximizing the efficiency of the network. In this case, a network structure, in which the n×n number of terminals could be accommodated only using the n number of wavelength, is made possible.

As mentioned above, in the internet protocol network according to the present invention, each of the terminals communicates with a single sub-ring controller and all the sub-ring controllers communicates via a single main ring controller managing the sub-ring controllers. This is for preventing a wavelength collision occurring at the time when the n number of wavelengths is reused by all the sub-rings.

A routing scheme using this wavelength identifying code is not applied only to a nested ring structure as in the present invention but it can be applied to any networks satisfying the above-mentioned four prerequisites. If the routing scheme using the wavelength identifying code proposed by the present invention is employed in the nested ring structure proposed by the present invention, however, the number of terminals that could be accommodated can be maximized using the limit frequency and the most simplified structure can be made considering the survival of the network.

As aforementioned, the basis structure of the IPOW network according to the present invention and a routing scheme using the λ tag in this network structure were explained, and then each of devices for establishing the routing scheme will be explained as follows.

As mentioned above, a wavelength coupler is mounted to each of the terminals connected to the sub-ring and each of the connection nodes connected to the main ring, which adds/drops only its own user wavelength allocated to himself.

Figure 4:
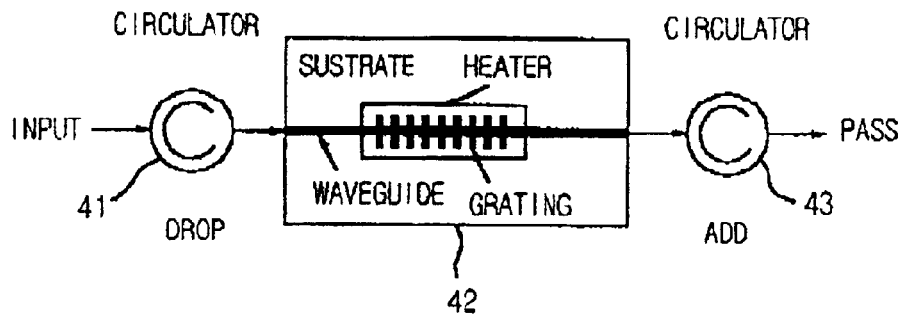
FIG. 4 shows one embodiment of a wavelength coupler, which is installed at each of the terminals in the sub-ring and at each of the connection nodes in the main ring.

FIG. 4 shows one embodiment of a wavelength coupler, which is installed at each of the terminals in the sub-ring and at each of the connection nodes in the main ring. The wavelength coupler includes an input circulator 41, a fiber Bragg grating 42 for reflecting unique user wavelength from corresponding terminal or connection node and passing other wavelengths, and an output circulator 43.

The input circulator 41 transfers the wavelength division multiplexed signal inputted via the sub-ring or the main ring to the fiber Bragg grating 42, and also drops unique user wavelength from the corresponding terminal or the connection node, which is reflected by the fiber Bragg grating 42. The output circulator 43 transfers the signal added at the corresponding terminal or the connection node to the output terminal of the fiber Bragg grating 42, multiplexes it along with the signal passed through the fiber Bragg grating 42 and then transmit the multiplexed signal to the sub-ring or the main ring.

Figure 5:
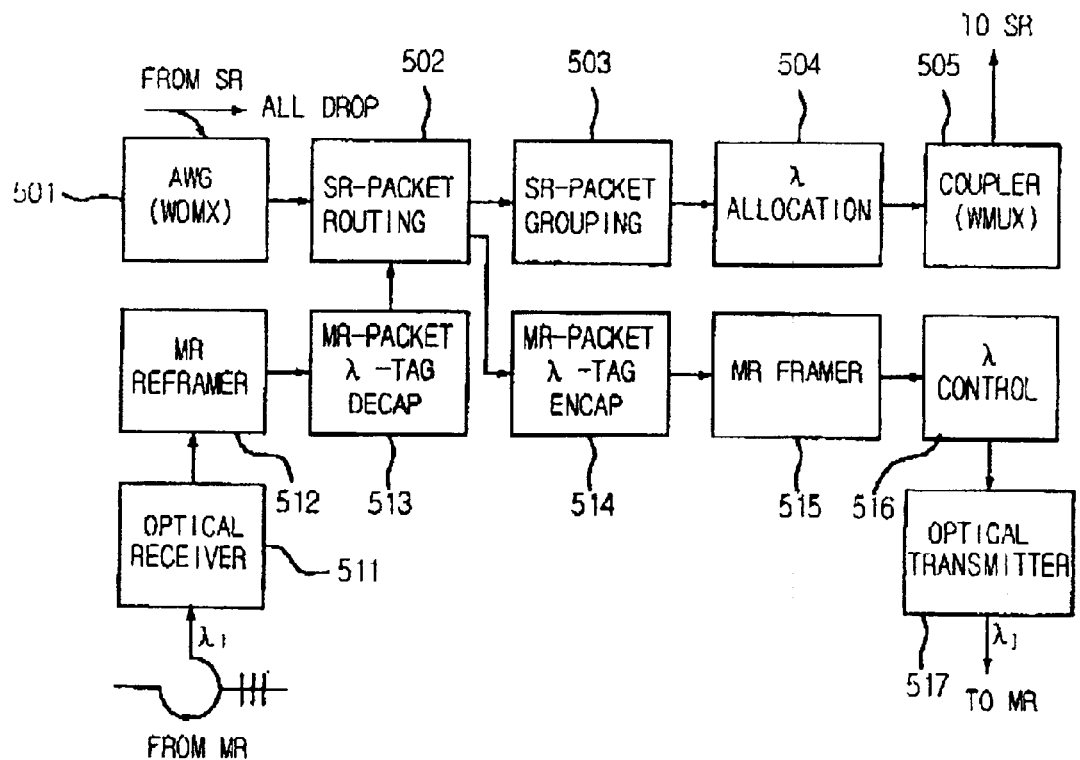
FIG. 5 is a functional block diagram of a sub-ring controller according to one embodiment of the present invention.

FIG. 5 is a functional block diagram of the sub-ring controller according to one embodiment of the present invention.

Referring now to FIG. 5, the sub-ring controller is mainly divided into a sub-ring managing section and a main ring managing system. The sub-ring section includes a de-multiplexer (AWG) 501 for de-multiplexing the wavelength division multiplexed signal from the sub-ring, a packet controller 502 for confirming the destination address of each of the de-multiplexed signals and for transferring the de-multiplexed signal to a packet grouping section 503 if the destination address belongs to the same sub-ring or transferring the de-multiplexed signal to a λ tag attachment section (ENCAP) 514 if the destination address belongs to other sub-ring to route the path of the packet, a packet grouping section 503 for grouping the packets for respective destination addresses from the packet controller section 502, a wavelength allocating section 504 for loading the grouped packet on the wavelengths allocated to each of the destination terminals, and a multiplexer (Coupler) 505 for performing a wavelength division multiplexing for the signal to be transmitted to the respective destination terminals to transmit the result to the sub-ring.

The main ring managing section includes a light receiver 511 for receiving only a signal having a corresponding wavelength via the wavelength coupler from the main ring, a lead frame section (Re-framer) 512 for processing a signal including CRC (cyclic redundancy check), a λ tag delineating section (DECAP) 513 for delineating a λ tag and for transmitting a packet to the packet controller 502 in the sub-ring managing section, a λ tag attachment section 514 for attaching the λ tag received from the pack controller 502 in the sub-ring managing section to the packet to be transmitted, a lead frame section (Framer) 515 for combining the λ tag with the packet to expand the combined packet, a wavelength controller 516 for transforming the expanded packet into a wavelength allocated to the corresponding connection node, and a light transmitter 517 for transmitting the expanded packet to the main ring.

Figure 6:
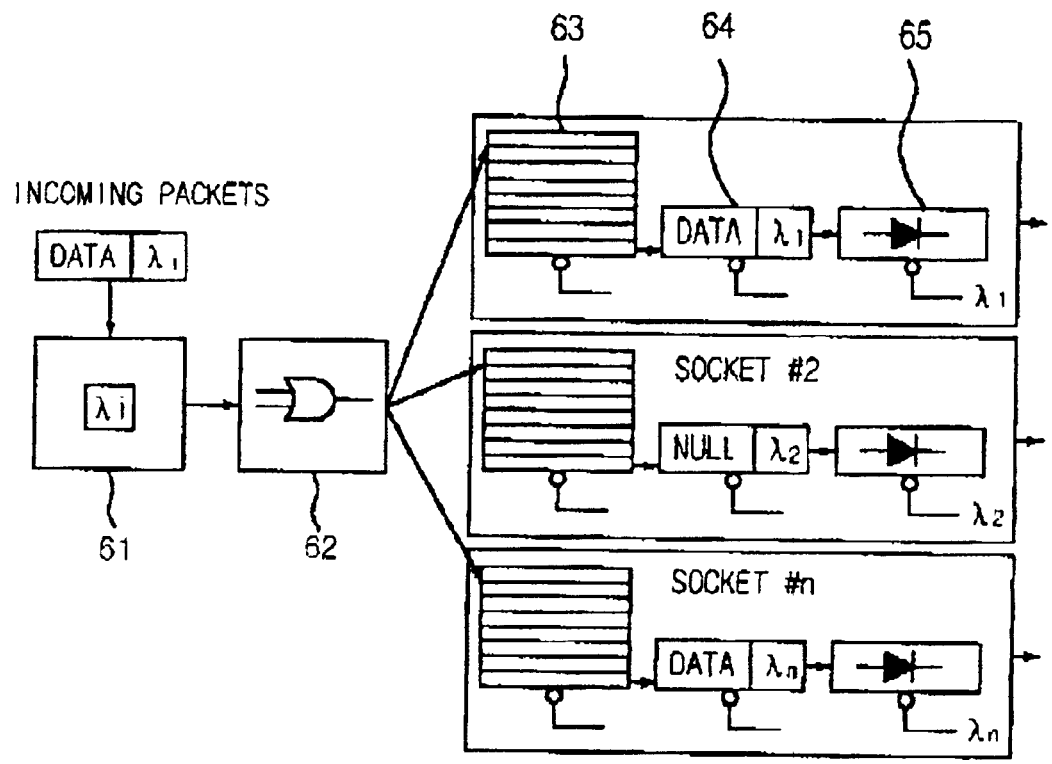
FIG. 6 is a construction of a high-level network controller according to one embodiment of the present invention.

If the source terminal and the destination terminal are connected to the same sub-ring, a routine is possible when the packet is processed only within the sub-ring managing section. If the source terminal and the destination terminal are not connected to the same sub-ring, a routing is possible when the packet is processed both in the sub-ring managing section FIG. 6 is a construction of a high-level network controller according to one embodiment of the present invention, which is a structure for switching a packet at high speed.

The main network controller includes a λ-tag delineator 61, a λ-tag based switching section 62, and buffers 63, a lead frame section 64 and a transmitter 65 each provided for wavelengths, respectively. The λ-tag delineator 61 delineates the λ-tags added to the packets. The λ-tag based switching section 62 distributes the packets to the buffers 63 allocated to respective wavelengths based on the delineated λ-tag. The buffers 63 store the packets and each are provided for wavelengths, respectively. The buffers manage the packets based on the FIFO (first in first out) priority or any priority policy if there is any specific priority. The lead frame section 64 adds/transmits the λ-tag and information necessary for transmitting the packet if necessary. The transmitter 65 reads the packets from the buffers 63 to convert the read packets into optical signals.

At this point, in respective control nodes, as the packets loaded on different wavelengths do not share the buffers and the transmitter, the time taken to manage the buffers can be shorten and the packet can be transmitted with being loaded on a desired wavelength, without requiring an expensive wavelength converting apparatus.

At this point, the main ring controller switches at high speed the packet extended by the wavelength socket scheme. In other words, if the packet arrives at the main ring controller, the λ-tag delineator 61 confirms the λ-tag added to the packet and the λ-tag based switching section 62 distributes the packet into the buffer allocated to the corresponding wavelength according to the λ-tag. The buffers 63 are temporarily the transmitted packet and the transmitter 65 reads the packet from the corresponding packet and then loads the signal on the wavelength allocated to transmit it. At this time, if the sender tries to transmit the packet to the sub-ring control node to which the destination belongs using the sub-ring control node connected, if necessary, the lead frame section 64 adds information necessary for transmitting the packet in addition to the λ-tag of the corresponding destination to transmit it.

As such, the wavelength socket scheme operates very simply. As the buffer and the transmitter are independently operated by wavelengths, however, the structure of the switch becomes simplified. Also, as additional wavelength transformer is not required, a stable operation of the switch can be assured. Further, due to combination of the simple structure and the routing scheme using the λ-tag, the speed of the packet switching could be significantly improved.

As such, the wavelength socket scheme in which the buffer, the lead frame and the transmitter are provided for wavelengths is the core technology in developing a high-speed packet switch suitable for the wavelength division multiplexing network. The construction of the switch has the following characteristics.

First, independent output buffers and transmitters are allocated to respective wavelengths. Second, the output buffers allocated for respective wavelengths can be independently managed in order to assure QoS (quality of service) for wavelengths. For example, considering only two buffers, one buffer may be managed based on the FIFO priority and the other buffer may be managed based on a given Heuristic algorithm.

Figure 7:
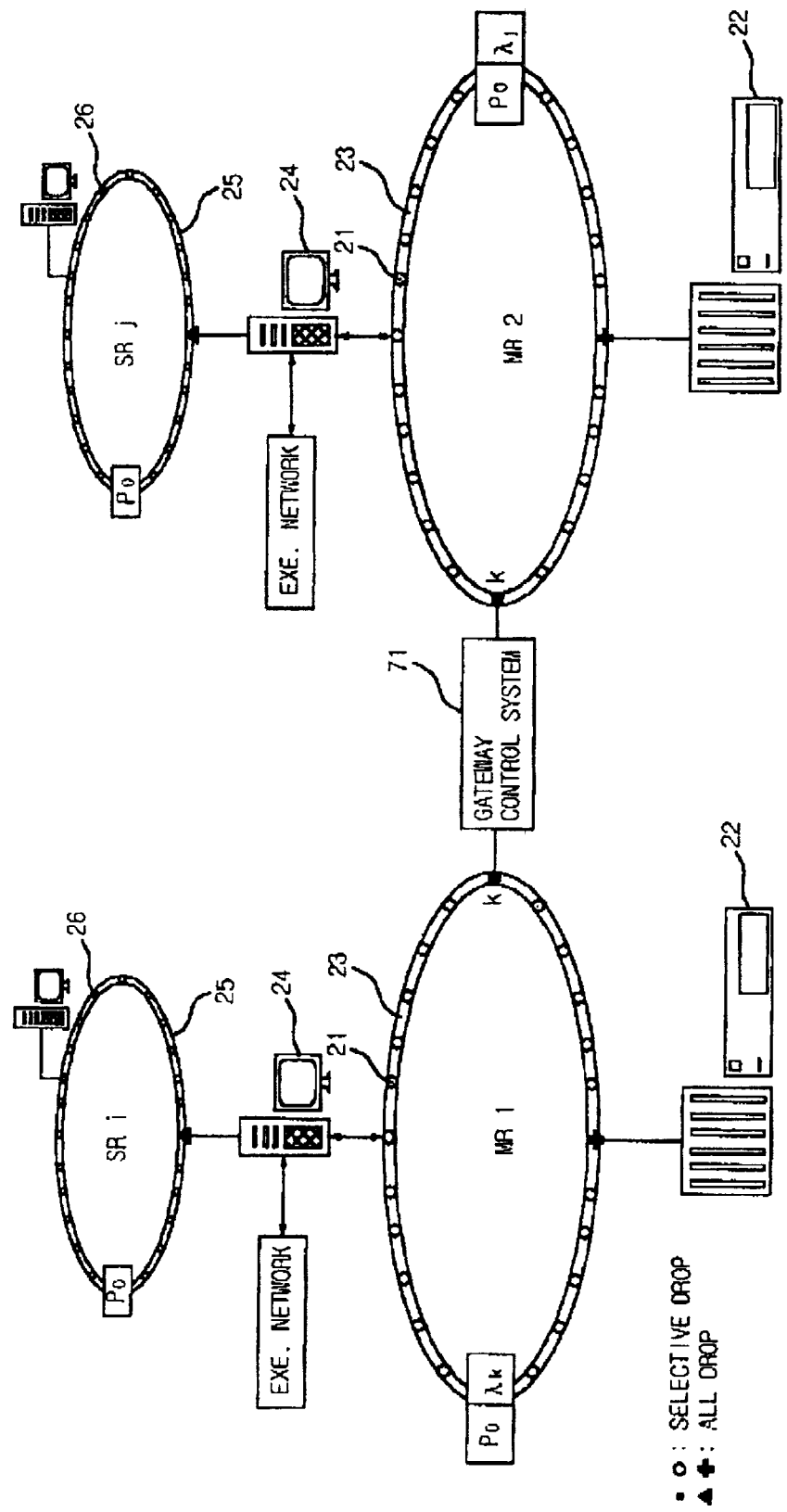
FIGS. 7 to 9 are simplified views of the horizontally extended IPOW network in FIG. 2 for explaining a routing scheme in an internet protocol over WDM network according to various embodiments of the present invention.
Figure 8:
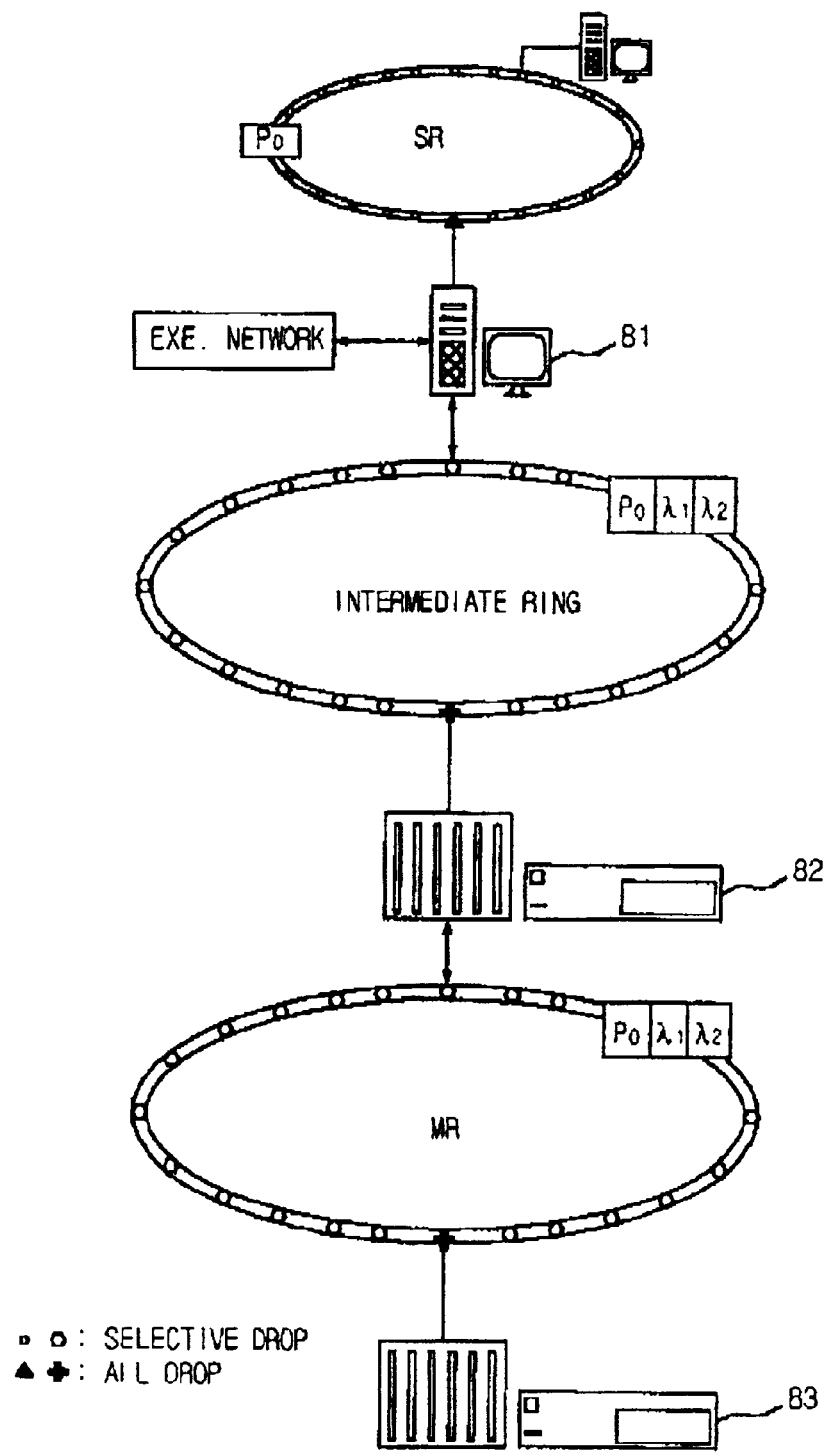
Figure 9:
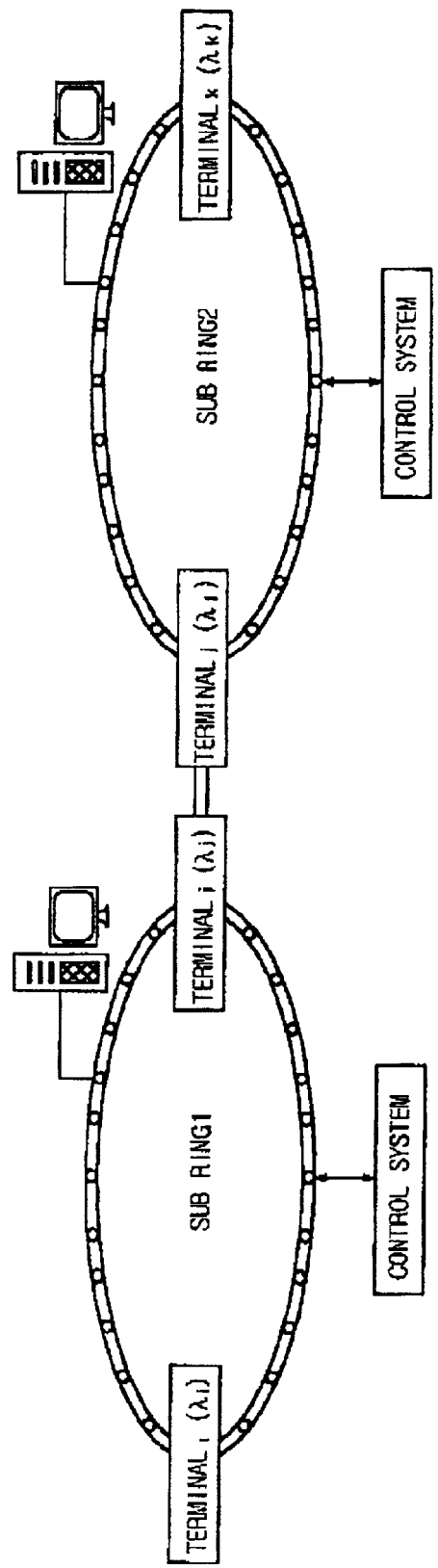

The basic structure of the IPOW can be extended horizontally or vertically, and the sub-rings of FIG. 3 only can be extended horizontally. FIGS. 7 to 9 illustrates various embodiments of the network structures.

FIG. 7 illustrates an horizontally extended embodiment of the basic structure of the IPOW network shown in FIG. 3. In this structure, each connection nodes of two main rings is mutually connected by using a gateway controller, and is connected to other main ring instead of the sub-ring. This gateway controller changes λ-tag transmitted from a transmitting part of the main ring into wavelength identifying code of said sub-ring having destination terminal.

That is, referring FIG. 7, a flow of transmitting a packet to a sub-ring j of a second main ring from a sub-ring i of the first main ring will be explained as follows. First, when packet ($P_0$) including an address of the destination terminal is transmitted from n number of terminals of the sub-ring of the first main ring, the controller of sub-ring i confirms that the destination terminal locates in sub-ring j of the second main ring, adds wavelength identifying code k according to connection node k of the two main ring, loads the extended packet ($P_0+k$), and then transmits it to the controller of the second main ring.

The controller of the first main ring extracts and confirms the wavelength identifying code of the extended packet ($P_0+k$), and loads to transmit the extended packet ($P_0+k$). The extended packet ($P_0+k$) to $\lambda_k$ drops from connection node k of the first main ring, and transmits it to gateway controller. This gateway controller 71 removes λ-tag in the extended packet ($P_0+k$), confirms the address of destination terminal of the packet, adds the wavelength identifying code j according to sub-ring j having the destination terminal, and then loads the extended packet ($P_0+k$) to $\lambda_k$, and then transmits it to the second main ring. The controller of the second main ring loads and transmits the extended packet to $\lambda_j$ using the wavelength identifying code j of the extended packet, and the extended packet drops at the sub-ring j FIG. 8 illustrates the basic structure of IPOW shown FIG. 3 extended vertically according to an embodiment of the present invention. That is, sub-ring, intermediate ring, and main ring make a structure of a three-layer structure. Said sub-ring controller 81 adds a first λ-tag $g(\lambda_1)$ of the intermediate ring having destination terminal and a second λ-tag ($\lambda_2$) of identifying code of said sub-ring, to the packet ($P_0$) for transmitting, and then transmits extended packet. That is, said sub-ring controller attaches two λ-tags, and transmits to intermediate ring. Of course, if said sub-ring controller intends to transmit the packet to the sub-ring connected to the intermediate ring, the state of the first λ-tag ($\lambda_1$) is null, and the second λ-tag ($\lambda_2$) adds to transmit the sub-ring identifying code having destination terminal.

Then, said intermediate ring controller 82 confirms a first λ-tag of said intermediate ring included in the extended packet transmitted from said sub-ring, and if a state of the first λ-tag is null, said intermediate ring controller confirms identifying code of said sub-ring, and then transmits said extended packet to said sub-ring having said destination terminal, and if the state is not null, it transmits said extended packet to said main ring. Then, said main controller 83 confirms identifying code of said intermediate ring included in the extended packet transmitted from said intermediate ring, and then changes said identifying code of said intermediate ring into a null state, and then transmits said extended packet to said intermediate ring having said destination terminal.

FIG. 9 shows an example in which two sub-rings are horizontally extended.

That is, any terminal in a first sub-ring and any terminal in a second sub-ring are connected or two sub-rings share a single terminal, and the same unique user wavelength is allocated to two terminals in the sub-rings. FIG. 9 shows that a terminal j in the first sub-ring and a terminal j in the second sub-ring are connected to each other.

First, the terminal i in the first sub-ring generates a packet to be transmitted to a terminal k in the second sub-ring, adds/extends a source address and a destination address to the corresponding packet, and then loads the extended packet on his unique user wavelength ($\lambda_i$). Then, the wavelength coupler in the terminal i adds/multiplexes the unique user wavelength on which the extended packet is loaded, and then sends the multiplexed wavelength. The wavelength division multiplexed signal transverses the first sub-ring and then drops to a first sub-ring controller. Then, the first sub-ring controller de-multiplexes the wavelength division multiplexed signal, loads it on the unique user wavelength $g(\lambda_j)$ in the terminal j being the destination terminal, using the destination address included in the corresponding packet, and the performs wavelength division multiplexing process for the de-multiplexing wavelength division signal along with other wavelengths to transmit the result to the first sub-ring. The wavelength coupler in the terminal j of the first sub-ring drops only its own unique user wavelength ($\lambda_j$) among the wavelength division multiplexed signals that flow into the first sub-ring.

The terminal j in the first sub-ring passes the dropped signal to the terminal j in the second sub-ring, and the terminal j in the second sub-ring and adds/multiplexes it to the wavelength division multiplexed signal in the second sub-ring to send the result. The wavelength division multiplexed signal transverses the second sub-ring and then drops to a second sub-ring controller. Then, the second sub-ring controller de-multiplexes the wavelength division multiplexed signal, loads it on the unique user wavelength ($\lambda_k$) in the terminal k being the destination terminal, using the destination address included in the corresponding packet, and then performs wavelength division multiplexing process for the de-multiplexed wavelength division signal along with other wavelengths to transmit the result to the second sub-ring. The wavelength coupler in the terminal k of the second sub-ring drops only its own unique user wavelength ($\lambda_k$) among the wavelength division multiplexed signals that flow into the first sub-ring.

FIG. 9 shows that two sub-rings are horizontally connected to each other, but other sub rings may be connected thereto via other terminals.

FIG. 8 is one embodiment for illustrating a network structure in which sub-rings are vertically extended.

In the IPOW network having this structure, a method of routing a packet from a sub-ring 1 to a sub-ring n (where n is a natural number greater than 1) will be below explained.

First, if a packet P, which is generated at a given terminal connected to the sub-ring 1, arrives at the sub-ring controller 1, the sub-ring controller 1 confirms the destination address of the packet P. That is, as m×n number of terminals is connected in this IPOW network, totally n×n number of IP address comparison operations are performed. At this time, if the packet is transmitted/received between the terminals connected to the same sub-ring, the corresponding packet is routed in the corresponding sub-ring controller according to the existing internet protocol, without being transferred to the main ring.

As mentioned above, the present invention has the following advantages, compared to the technology of switching and transmitting an optical signal using the conventional SDH/SONET protocol:

First, it can minimize additional information to be added to the IP packet in order to switch and transmit the optical signal. Also, a high-speed switching is made possible due to simplified packet structure. Second, it does not require expensive optical element or systems. Third, it can minimize the processing by electrical signal to improve stability and performance of the network.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed are:

1. A network structure for IP-over-WDM comprising:

a plurality of sub-rings each for accommodating n number of terminals (where n is a positive integer);

a main ring having m number of connection nodes (where m is a positive integer), each of the connection nodes connected to a sub-ring via a sub-ring controller;

a sub-ring controller for connecting an associated sub-ring to said main ring through the connection node, and controlling the flow of packets inside said sub-ring and the flow of packets between said sub-ring and said main ring; and a main ring controller for controlling the flow of packets inside said main ring, wherein all the sub-ring controllers share information on IP addresses of all the terminals connected to the entire network and a wavelength allocated to the sub-ring to which its IP address belongs and communicate with the main ring controller that manages the sub-ring controllers using different wavelengths wherein all the terminals connected to a given sub-ring communicate with corresponding sub-ring controllers using different wavelengths, respective terminals communicate via the sub-ring controllers each of which is connected to the sub-rings, respectively, wherein said terminals and connection nodes each add/drop only their own unique wavelengths, said sub-ring controller configured to drop all wavelength division multiplexed signals flowing in the sub-ring itself to de-multiplex the signals, a) to load each of said signals on a unique wavelength assigned to its terminal by using a destination address that is included in the packet, and then multiplex again said signal to transmit to said sub-ring when the destination terminal is located on the sub-ring of itself, and b) to add an identifying code (which is called a λ-tag) designating the sub-ring having a destination terminal of the packet, load the packet on its unique wavelength assigned between said sub-ring controller and the main-ring controller, and then transmit it to the connection node of said main ring when the destination terminal is located on the sub-ring other than the sub-ring having the source terminal of the packet, said main ring controller configured to drop all the wavelength division multiplexed signals flowing in the main ring itself, extract the λ-tag information, switch incoming packets based on the λ-tag information, load packets on their unique wavelengths assigned to the respective sub-ring controller, and then transmit packets to the main ring, wherein said main ring controller switches the packets extended by an wavelength socket scheme in which a buffer storing the packet, a lead frame framing the packet to be suitable for being transmitted and a transmitter converting the packets into optical signals are provided for each wavelength, and each sub-ring controller and the main ring controller configured to transmit signals only in a uniquely defined direction.

2. The network structure according to claim 1, wherein the maximum number m of the connection nodes in said main ring and the maximum number n of the terminal in one sub-ring are the same (m=n), so that the n number of wavelengths ($\lambda_{l-\lambda_n}$) assigned to each of the sub-ring in the main ring for connecting the respective sub-ring controller to the main-ring controller, and the same n number of wavelengths ($\lambda_{l-\lambda_n}$) assigned to each of the terminal in a given sub-ring are fully reusable, resulting in the $n^2$ number of terminals being interconnected by using the n number of wavelengths ($\lambda_{l-\lambda_n}$).

3. The network structure according to claim 1, wherein each terminal and connection node includes a wavelength coupler to add/drop only the assigned wavelength, said wavelength coupler including an input circulator, a fiber Bragg grating for reflecting a unique user wavelength from a corresponding terminal and for passing other wavelengths, and an output circulator, said input circulator transfers the wavelength division multiplexed signal inputted via said sub-ring to said fiber Bragg grating and drops the unique user wavelength from the corresponding terminal, that is reflected by said fiber Bragg grating, said wavelength coupler adds the same wavelength as dropped at the input of the wavelength coupler.

4. The network structure according to claim 1, wherein the sub-ring controller comprises:

a sub-ring managing section including:
   a de-multiplexing means for dropping the WDM signals flowing in/from said sub-ring and for dividing them into individual wavelengths;
   a routing means for routing the packets in the de-multiplexed wavelengths according to their destination terminals, using the destination terminal address included in the packets;
   a packet grouping means for grouping the packets that have the same destination terminal;
   a wavelength allocating means for loading said packets grouped by each of the destination terminals on the unique wavelengths of said destination terminals; and
   a wavelength multiplexing means for multiplexing all the wavelengths into a single fiber of the sub-ring so that WDM signals containing the packets are transmitted to the destination terminals in the sub-ring, and a main ring managing section including:
   an optical receiver for receiving the unique wavelength signal from said main ring through the connection node attached to the receiver;
   a reframe means for synchronizing said received signal and for receiving the packet including CRC (cyclic redundancy check);
   a λ-tag extracting means for extracting said λ-tag included in the received packet from the main-ring and transferring the extracted packet to the routing means;
   a λ-tag attachment means for attaching the λ-tag identifying the sub-ring having the destination terminal according to the address included in the packet to be transmitted;
   a frame means for framing the packet to be suitable for transmission through the network; and
   a light transmitter for converting an electrical packets into optical signals with the wavelength assigned to the sub-ring controller.

5. An network structure according to claim 4, wherein said packet grouping means includes at least n number of buffers for storing the packets discriminated according to their destinations by said routing means.

6. The network structure according to claim 1, wherein the main ring controller comprises;
   a λ-tag delineator for delineating a destination sub-ring by extracting and reading information from the λ-tag added to the packets;
   a λ-tag based switching section for routing the packets by their destination sub-rings according to the λ-tag;
   at least n number of buffers, each buffer provided for a wavelength, respectively, for storing the packets distributed according to the destination from said λ-tag based switching section;
   at least n number of lead frame sections for reading the packets from each of the buffers and restoring the λ-tag corresponding to said destination sub-ring, and framing the packet to be suitable for being transmitted; and
   n number of transmitters for converting the packets from each of said lead frame sections into optical signals wavelengths assigned to each transmitter.

7. The network structure according to claim 1, wherein two or more of a unit network comprise a main ring and a plurality of sub-rings connected to the main ring and constructed horizontally by connecting said main ring with another main ring by means of a gateway controller that performs transferring packets from a connection node belonging to said main ring to a connection node belonging to another main ring, and vice versa, a transmitting part of said sub-ring controller adds to the packet to be transmitted to a sub-ring controller belonging to another main ring an identifying code (λ-tag) designating the connection node connected to the gateway controller, and then transmits it to a transmitting part of said main ring, said gateway controller replaces the identifying code of said packet by an identifying code designating a receiving part of said sub-ring, and then transmits it to a receiving part of said main ring.

8. The network structure according to claim 1, wherein a plurality of intermediate rings are inserted between the plurality of said sub-rings and the main ring, resulting in a three-layer structure, said intermediate ring having intermediate ring controllers for routing packets between two sub-rings belonging to the intermediating ring or between those belonging to different intermediate rings, respectively, through said main ring, said sub-ring controller attaches the packet to the identifying code of the destination intermediate ring having a destination sub-ring and a second identifying code of said destination sub-ring belonging to the intermediate ring, and then transmits the extended packet with two identifying codes, said intermediate ring controller confirms identifying code of the destination intermediate ring included in the extended packet transmitted from the source sub-ring, and if the identifying code indicates the intermediate ring as itself, then said intermediate ring controller confines the identifying code of destination sub-ring, and then transmits said extended packet to the destination sub-ring having said destination terminal on the other hand, if the destination intermediate ring identifying code indicates another intermediate ring than itself, then, it transmits said extended packet to said main ring, and said main ring controller confirms the destination intermediate ring identifying code included in the extended packet transmitted from the source intermediate ring, and then transmits said extended packet to said intermediate ring having said destination terminal.

9. A method of transmitting/receiving packets in a sub-ring controller for controlling transmission/reception of the packets between any two terminals in an internet protocol over wavelength division multiplexing (WDM) network accommodating n number of terminals (where n is a positive integer) to which unique wavelengths are respectively allocated, comprising the steps of:

if dropping all packets flowing in the sub-ring itself to de-multiplex the packets, said packets transmitted from a source terminal that transmits packets containing destination terminal addresses on their own unique wavelengths of the source terminal;

routing the paths of the de-multiplexed packets by the destination terminal addresses using the destination terminal addresses contained in the packets in order to delineate the packets by their destination terminal;

grouping the packets to be transmitted to each of the destination terminals by temporarily storing the packets in a buffer allocated to respective destination terminals; and loading the grouped packets on unique wavelengths assigned to the destination terminals and then transmitting the grouped packets to the sub-ring, whereby said destination terminal drops said grouped packets by dropping only its assigned wavelength among the packets that flow into the sub-ring, wherein the sub-ring controller shares information on IP addresses of all the terminals connected to the entire network and the wavelength allocated to the sub-ring to which its IP address belongs, and wherein all the terminals connected to a given sub-ring communicate with a corresponding sub-ring controller using different wavelengths.

wherein a plurality of connection nodes are connected via a main ring along which the wavelength division multiplexing signal transverses, the method in said sub-ring controller for attaching an unique wavelength information (λ-tag) designating a destination sub-ring to the packet to be transmitted from its own sub-ring to other sub-ring to transmit the packet to said main ring, includes;

a λ-tag attachment step for attaching the λ-tag to designate the destination sub-ring, which will be used at the step of routing the packet in the main-ring controller;

a framing step for framing the packets with the λ-tag to make them suitable for being transmitted toward the main-ring controller;

a wavelength allocating step of loading the expanded packet on it own unique user wavelength; and a light transmission step of converting the expanded packets into optical signals with assigned wavelength and for transmitting the optical signals to the main ring.

10. The method of transmitting/receiving packets according to claim 9, wherein a plurality of connection nodes connected via a main ring along which the wavelength division multiplexing signal transverses, the method in said sub-ring controller for detaching the λ-tag from the packet received from said main ring to transmit the packet to the destination terminal, includes:

a light receiving step of receiving the unique wavelength signal from said main ring;

a refraining step of synchronizing the received signal and for reading contents of the signal including CRC; and a λ-tag detaching step of detaching the λ-tag to transmit the packet to the routing step.

11. The method of transmitting/receiving packets according to claim 9, wherein the main ring controller for receiving the extended packet to which the λ-tag is attached from the source sub-ring to transmit the packet to the destination sub-ring includes:

a λ-tag delineation step of delineating the destination sub-ring using the λ-tag contained in the packets inputted;

a λ-tag based switching step of distributing the packets by their destinations according to the λ-tag of the destination sub-ring;

a buffering step of storing the packets distributed according to the destination sub-ring by said λ-tag based switching step into buffers;

a refraining step of reading the packets from the buffers and making them suitable for be transmitted to the destination sub-ring; and a transmission step of converting the lead framed packets into optical signals with wavelengths allocated according to each of destination sub-rings.

* * * * *